(12) United States Patent
Ranjan et al.

(10) Patent No.: US 7,984,068 B2
(45) Date of Patent: Jul. 19, 2011

(54) PROVIDING PROFILE INFORMATION TO PARTNER CONTENT PROVIDERS

(75) Inventors: Ritcha G. Ranjan, New York, NY (US); James M. Watts, New York, NY (US)

(73) Assignee: Google Inc., Mountain View, CA (US)

( * ) Notice: Subject to any disclaimer, the term of this patent is extended or adjusted under 35 U.S.C. 154(b) by 112 days.

(21) Appl. No.: 11/754,146

(22) Filed: May 25, 2007

(65) Prior Publication Data

US 2008/0294603 A1 Nov. 27, 2008

(51) Int. Cl.
*G06F 17/30* (2006.01)

(52) U.S. Cl. ........ 707/784; 707/705; 707/722; 707/758; 707/769; 707/770; 707/781

(58) Field of Classification Search .................. 707/722, 707/705, 758, 769, 770, 781
See application file for complete search history.

(56) References Cited

U.S. PATENT DOCUMENTS

| | | | |
|---|---|---|---|
| 2002/0035619 A1* | 3/2002 | Dougherty et al. ........... 709/219 |
| 2002/0068585 A1 | 6/2002 | Chan et al. |
| 2002/0095454 A1* | 7/2002 | Reed et al. ..................... 709/201 |
| 2003/0163399 A1* | 8/2003 | Harper et al. ................... 705/35 |
| 2004/0054691 A1* | 3/2004 | Sharma et al. ............. 707/104.1 |
| 2004/0213409 A1 | 10/2004 | Murto et al. |
| 2005/0102201 A1* | 5/2005 | Linker et al. ..................... 705/27 |
| 2005/0213592 A1* | 9/2005 | Kalish ........................... 370/401 |
| 2007/0027839 A1 | 2/2007 | Ives |
| 2007/0060099 A1* | 3/2007 | Ramer et al. .................. 455/405 |
| 2007/0073717 A1* | 3/2007 | Ramer et al. .................... 707/10 |
| 2007/0112739 A1 | 5/2007 | Burns et al. |
| 2007/0271202 A1* | 11/2007 | O'Connor ...................... 705/400 |
| 2008/0155614 A1* | 6/2008 | Cooper et al. ................... 725/91 |
| 2008/0160956 A1* | 7/2008 | Jackson et al. ................ 455/406 |
| 2008/0168099 A1* | 7/2008 | Skaf ........................... 707/104.1 |

FOREIGN PATENT DOCUMENTS

KR 10-2005-0099672 10/2005

OTHER PUBLICATIONS

International Search Report and Written Opinion, PCT/US2007/086159, mailed Apr. 8, 2008, 10 pages.
International Preliminary Report on Patentability for Application No. PCT/US2007/086159, dated Dec. 10, 2009, 6 pages.

\* cited by examiner

*Primary Examiner* — Frantz Coby
(74) *Attorney, Agent, or Firm* — Fish & Richardson P.C.

(57) ABSTRACT

In some implementations, a computer-implemented method includes receiving a search query, at an information provider, from a mobile device; generating a plurality of search results that are responsive to the search query and directed to corresponding content providers that are external to the information provider; identifying one or more search results from the plurality of search results that are directed to partners of the information provider; and providing, to the mobile device, the plurality of search results, wherein the one or more search results directed to partners of the information provider include location information that is stored in a profile maintained by the information provider and associated with the mobile device, wherein the location information is passed to the corresponding partners upon selection of the one or more search results.

20 Claims, 7 Drawing Sheets

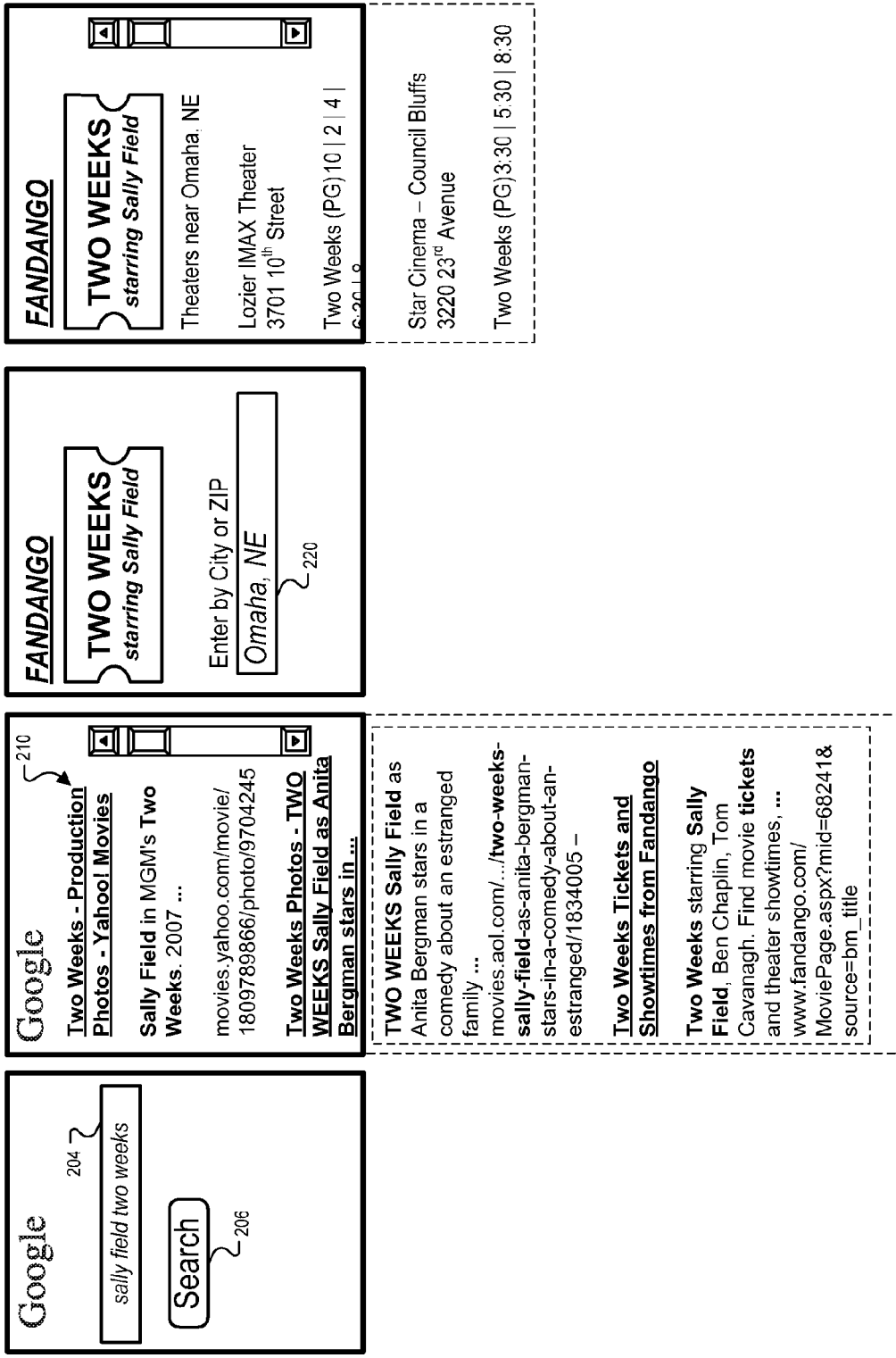

PROVIDING PROFILE INFORMATION TO PARTNER CONTENT PROVIDERS

TECHNICAL FIELD

Various implementations in this document relate generally to the presentation of search results in response to a search query.

BACKGROUND

Vast amounts of information are available on the Internet, the World Wide Web, and on smaller networks. Users of desktop, laptop, and notebook computers on these networks have long enjoyed rich content, like images, audio, video, animation, and other multimedia content. As the number of features available in mobile devices (e.g., cell phones, smartphones, personal digital assistants (PDAs), personal information managers, etc.) has increased, user expectations of those devices have also increased. Users now expect that much of this rich content will also be available from their mobile devices. They expect to have access—on the road, in coffee shops, and at home and in the office through mobile devices—to information previously available only from a personal computer that was physically connected to an appropriately provisioned network. They want news, stock quotes, maps and directions and weather reports from their cell phones; email from their personal digital assistants; up-to-date documents from their smartphones; and timely, accurate search results from all their mobile devices.

Because input capabilities may be more limited in a mobile device (e.g., a smartphone) than in a fixed computing device (e.g., a desktop computer), more effort may be required of a user to enter a search query (or other information) from the mobile device than would be required of the user in entering the same search query from the fixed computing device. In addition, because displays in various mobile devices are often smaller than displays in fixed computing devices, it may be possible only to display a relatively small amount of information at any given time on a mobile device. Finally, data connections between a mobile device and various networked resources (e.g., the Internet) may be slower than corresponding data connections between a fixed computing device and the same networked resources.

SUMMARY

In some implementations, a computer-implemented method includes receiving a search query, at an information provider, from a mobile device; generating a plurality of search results that are responsive to the search query and directed to corresponding content providers that are external to the information provider; identifying one or more search results from the plurality of search results that are directed to partners of the information provider; and providing, to the mobile device, the plurality of search results, wherein the one or more search results directed to partners of the information provider include location information that is stored in a profile maintained by the information provider and associated with the mobile device, wherein the location information is passed to the corresponding partners upon selection of the one or more search results.

In some implementations, a computer-implemented method includes receiving a search query, at an information provider, from a mobile device; generating a plurality of search results that are responsive to the search query and directed to corresponding content providers that are external to the information provider; identifying one or more search results from the plurality of search results that are directed to partners of the information provider; and providing, to the mobile device, the plurality of search results, wherein the one or more search results directed to partners of the information provider include location information associated with the mobile device that is passed to corresponding partners upon selection of the one or more results.

In some implementations, the computer-implemented method further includes retrieving the location information from a profile associated with the mobile device. The profile can be maintained by the information provider. The profile can include default location information. In some implementations, the computer-implemented method further includes receiving current location information corresponding to a current physical location of the mobile device, wherein the current location information and the location information from the profile correspond to geographically distant locations (e.g., locations that are more than about 25 miles apart). Each search result can include a link that is configured to initiate a session with a corresponding content provider upon activation of the link by the mobile device. In some implementations, the location information is encrypted.

In some implementations, the computer-implemented method further includes determining whether each search result in the plurality of search results corresponds to a partner of the information provider. Determining whether each search result in the plurality of search results corresponds to a partner can include determining whether a domain associated with each search result is logged in a partners database. The partners database can be maintained by the information provider.

In some implementations, a system includes a search engine that receives a search query from a user device and generates a search result that is responsive to the received search query and directed to one of a plurality of content providers that are external to and separate from the search engine; a profile database that maintains profile information for a plurality of devices, including the user device; a partners database that stores information about a partner content provider from the plurality of content providers; and a results formatter that is configured to provide the search result to the user device and further configured to provide, with the search result, and from the profile database, profile information that is associated with the user device when the search result corresponds to the partner content provider.

The user device can be a mobile communications device. The results formatter can be configured to encrypt the profile information. In some implementations, the results formatter is configured to provide the search result and profile information in such a manner that selection of the search result by the user device causes the profile information to be transmitted to the partner content provider. The profile information can include default location information. In some implementations, the default location information and a current physical location of the user device are geographically distant locations. The profile information can include demographic information associated with a user of the user device. The profile information can include technical specification information associated with the user device.

In some implementations, a system includes a search engine that receives a search query from a user device and identifies a search result that is responsive to the received search query, wherein the search result comprises a link to content that is available from one of a plurality of content providers that are external to and separate from the information provider; a profile database that maintains profile information for a plurality of devices, including the user device; a designated partners database that stores information about at least one specific content provider of the plurality of content providers, wherein the at least one specific content provider is a designated partner of the information provider; and a means for providing to the user device the search result and, when the search result corresponds to the at least one specific content provider, profile information from the profile database that is associated with the user device.

The details of one or more implementations are set forth in the accompanying drawings and the description below. Other features, objects, and advantages will be apparent from the description and drawings, and from the claims.

DESCRIPTION OF DRAWINGS

FIGS. 2A-2D are screenshots that depict a search query, search results and content provided by a content provider in response to selection of a search result.

Like reference symbols in the various drawings indicate like elements.

DETAILED DESCRIPTION

Figure 1:
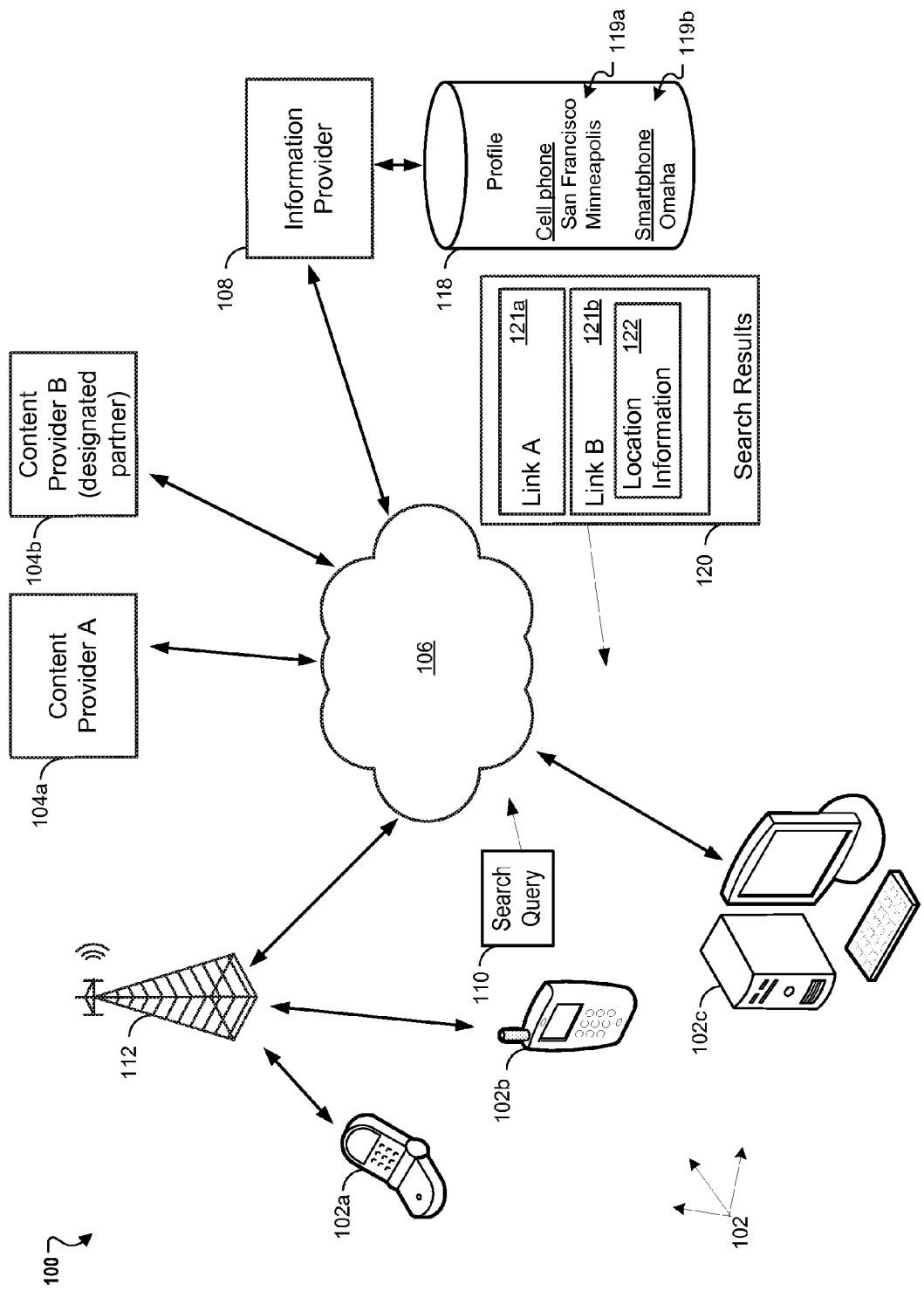
FIG. 1 is a block diagram of an example system that can generate search result(s) that are responsive to a search query and that can include profile information in search result(s) that point to content available from designated partner content providers.

A user of a mobile device can access information and other content from various sources, and the user may employ a search engine to locate the information or content. In some implementations, the desired information or content may be relevant to a particular geographical location. For example, a college student who submits a query for "pizza" to a search engine may be interested in locating pizza restaurants close to his or her current location. To enable a search engine to provide location-based search results, location coordinates associated with a current physical location of the device from which the query is submitted can be provided along with the search query itself. For example, the college student's mobile device may be GPS-enabled (i.e., enabled with Global Positioning System technology) and may transmit current location coordinates along with the query to enable a search engine to provide a list of pizza restaurants that are close to the current location of the college student's mobile device.

In some implementations, a mobile device user is interested in finding location-based information associated with locations other than the current physical location of the user's mobile device. For example, a business traveler may regularly search for information associated with three different locales (e.g., a city of residence, a nearby city of employment and a geographically distant city that the business traveler regularly frequents), and the business traveler may regularly search for information associated with a locale other than the current locale. To enable the business traveler to easily search for location-based information from locations other than his or her current physical location, a search engine or other information provider may maintain a profile for the device or the user. The profile may store one or more default or preferred locations (or other information associated with the user or mobile device).

To take advantage of the profile, a user of a mobile device can transmit to the information provider or search engine an identifier that is associated with the profile (e.g., a login or unique mobile device identifier), along with a corresponding search query. In some implementations, the identifier is automatically provided by the mobile device. For example, in some implementations, the mobile device can be configured to transmit a unique mobile device identifier along with search queries. As another example, in some implementations, the mobile device can be configured to transmit login information associated with the information provider, which may be stored by the mobile device (e.g., in a cookie or configuration file) any time a query is sent to the information provider. The information provider or search engine can then retrieve a preferred or default location from the profile and use the preferred or default location in generating responsive search results or in providing responsive content. An example profile and method of using such a profile are described in application Ser. No. 11/624,184, filed Jan. 17, 2007, which is hereby incorporated by reference.

Consider, as an example of a profile and its use, a college student who has previously set up an account with a search engine and configured the account to store Omaha, Nebr., as a preferred default location for searches and various other content provided by the search engine. In this example, if the college student submits the above-referenced "pizza" query to the search engine, along with an identifier associated with the student's profile, the search engine can, in some implementations, identify Omaha, Nebr., as a default location, associate this default location with the "pizza" query, and return results that relate to pizza restaurants in Omaha, Nebr.—in some implementations, without the student including "Omaha, Nebr." in the search query, and even if the mobile device from which the student sent the query is not in or near Omaha, Nebr.

In some implementations, location may be relevant to content initially identified by a search engine or another information provider that maintains profiles with various user information (e.g., default location information), but the content may be delivered by a content provider that is separate from the search engine or information provider. For example, a mobile device user may submit a query to a search engine to locate various search results related to a particular movie, then select one of the search results to navigate to content provided by a content provider that is separate from the search engine. In some implementations, it can be advantageous for the search engine to make profile information (e.g., information about a preferred or default location) available to the content provider, in order to enable the content provider to serve the mobile device user with a richer user experience. A more detailed example further illustrates.

Consider a business executive from Omaha, on business in New York City, employing a smartphone to access movie information on the Internet. In particular, the business executive may be interested in seeing the movie "Two Weeks" starring Sally Field upon her return to Omaha, but she may not know specific showtimes or the theaters showing the movie. To obtain information about the movie, the business executive may enter a query (e.g., "sally field two weeks") into a browser on her smartphone and submit the query to an information provider (e.g., Google).

The information provider can receive the search query and generate search results, which may include links to several web sites that movie enthusiasts visit to review information about specific movies showing throughout the country (e.g., www.fandango.com, www.imdb.com, www.foxsearchlight.com, www.sonypictures.com, www.warnerbros.com, etc.). The information provider can also retrieve information from a profile associated with the user or device from which the query was received, if such a profile exists. In this example, the information provider can retrieve Omaha, Nebr., as a default location and can include this information with one or more of the search results, such that when the user selects a search result with which profile information has been included, the profile information is provided to the content provider. As a result, the content provider may be able to serve content that is customized based on the profile information.

In some implementations, the profile information (e.g., default location information) is provided only to designated partners of the information provider. For example, referring to the example web sites above, if the information provider has a partner relationship with Fandago and Warner Brothers, but not with the other content providers, certain profile information may be included only in search results that link to www.fandago.com or www.warnerbros.com.

Upon selection of one of the search results corresponding to a business partner site, for example a site in the www.fandango.com domain, profile information (e.g., "Omaha, Nebr.") that is included in the selected search result can be provided to the partner site to facilitate a richer user experience. For example, Fandango can, in some implementations, use this information to customize the content that is provided to the business executive. More particularly, Fandango can provide information about the movie "Two Weeks" that is particular to Omaha, Nebr. (e.g., a list of Omaha theaters and showtimes), rather than providing generic, location-independent information about the movie.

FIG. 1 is a block diagram of an example system 100 that can maintain profile information for certain users or devices, receive a search query from the various users or devices, generate search result(s) that are responsive to the search query, and include corresponding profile information in search result(s) that correspond to designated partner content providers. As shown in one implementation, the system 100 includes various user devices (e.g., devices 102a, 102b and 102c) and various content providers (e.g., content providers 104a and 104b). The user devices 102a-c represent a plurality of electronic devices that may be employed to access content. For example, the user device 102a can be a mobile phone, the user device 102b can be a smartphone, and the user device 102c can be a personal computer. Users may employ these devices 102a-c (or other user devices not shown) to gain access to information available from content providers 104a and 104b.

As shown, the system 100 also includes an information provider 108 (e.g., Google). In some implementations, the information provider 108 provides services that include identifying content corresponding to search queries, (e.g., a search engine function). Specifically, the information provider 108 can receive search queries (e.g., a search query 110) from various devices 102a-c, generate search results (e.g., search results 120) that include or point to information or content that is responsive to the search queries, and provide the search results 120 to the corresponding device from which the search query 110 was received. In particular, the information included in or pointed to by the search results 120 can match one or more search terms in a received search query 110. For example, if a user submits a search query 110 such as "sally field two weeks," the information provider 108 can generate one or more search result(s) 120 that identify web sites that provide information related to the movie "Two Weeks" starring Sally Field.

In some implementations, the search results 120 include links 121a and 121b to content that is available from content providers that are external to the information provider 108. Upon receiving the search results 120, a mobile device user can select one of the included links 121a or 121b to retrieve corresponding content. For example, the link 121a can be a hyperlink to content available from a content provider 104a, and selection of the link 121a can cause content to be retrieved from the content provider 104a and displayed or presented in the mobile device. Similarly, the link 121b could be a hyperlink to content available from a content provider 104b, and selection of the link 121b can cause content to be retrieved from the content provider 104b and displayed or presented in the mobile device. Content providers 104a and 104b can include familiar web content providers, such as, for example, MSNBC, Time Warner Inc., CBS Corporation, MTV Networks Company, Guardian Newspapers Limited, NBC Universal, Inc., etc.

Content that is provided by the content provider 104a or 104b is generally associated with the search query 110 in some manner, but the content may not otherwise be customized for the mobile device or user that submitted the search query. In some implementations, the information provider 108 includes certain profile information (e.g., location information 122) in the search results 120 that can facilitate a richer user experience by enabling a corresponding content provider to customize content for the particular user or device to which the content is to be delivered. As one example, some content has an inherent relationship to a particular location (e.g., maps of a particular area, news for a particular locale, hours for a particular store, movie listings for a particular movie theater, etc.), and to the extent that that the information provider 108 stores information about a "preferred" location associated with the user or device from which the query was received (e.g., smartphone 102b), this preferred location information (e.g., location information 122) can be included in a search result 120. In particular, the preferred location information can be included in such a manner that it is passed to a content provider (e.g., content provider 104b) corresponding to that search result (e.g., search result 121b), upon selection of the search result by the user to enable the content provider (e.g., 104b) to provide customized content.

In some implementations, the end result is a richer user experience, in which the user initially receives relevant information or in which the user has fewer steps to navigate to desired information. In some implementations, the preferred location information is different from the current physical location of the device (e.g., the cell phone 102a) and may not be otherwise available. For example, referring again to the Omaha business executive in New York City, the business executive's preferred location (Omaha) may not be otherwise available to the content provider (e.g., Fandango) unless the information provider includes it in a search result that links to the content provider. That is, even if the content provider can obtain the user's current location (e.g., New York City), this current location information may not be useful for enhancing the user's experience, since in this example, the desired information relates to geographically distant Omaha.

In order to obtain information relevant to Omaha when this preferred location information is not included in the search results, the user may have to include "Omaha" in the search query, or select a location-generic or location-inappropriate search result and navigate from the search result to location specific information. In contrast, in systems in which an information provider maintains a profile and includes profile information with certain search results, the profile information can be used by other content providers to customize content delivered in response to a search, and the user's experience can be enhanced. For example, in some implementations, relevant information can be provided to the user more quickly, in response to a smaller query, or with less navigation than may otherwise be required.

To store information associated with a user or device that can be used to enhance a user's experience, the information provider 108 can employ a user profile store 118. For example, the user profile store 118 can include a profile 119*a* corresponding to the cell phone 102*a*, and a profile 119*b* corresponding to the smartphone 102*b*. In particular, as shown in one implementation, the profile 119*a* can store multiple default or preferred locations (e.g., San Francisco and Minneapolis) and the profile 119*b* can store one or more default or preferred locations (e.g., Omaha).

In some implementations, individual profiles can be wholly maintained by the information provider 108. In other implementations, profile information can be maintained in the mobile device itself (e.g., in one or more cookies or configuration files). In still other implementations, profile information can be stored in a distributed manner—i.e., partially at the information provider 108, and partially in a corresponding mobile device Although default or preferred location information is used above as an example of profile information, profiles can be used to store many other kinds of information about a user. For example, the user profiles 119*a* or 119*b* could can include specific profile information about each user such as, for example, the user's buying patterns, personal preferences, methods for accessing online information (e.g., specific user devices, etc.), demographic information, personal information, credit information, and location information. Location information can include, for example, a ZIP code (or other postal code), a municipality name, an area code, a congressional district, a GPS coordinate or range of coordinates, a latitude/longitude coordinate, an airport code, or a wireless network-provided location coordinate. As another example, a profile can store technical specifications of the mobile device or of the mobile device's networking capability (e.g., a screen size, screen color palette information, device processing or memory specifications, connection bandwidth, etc.).

In some implementations, profile information stored in profiles 119*a* or 119*b* is only provided to designated content providers (e.g., designated "partners" of the information provider). In some implementations, a designated partner content provider can have a particular relationship with the information provider. For example, the designated partner may have a business agreement with the information provider under which both entities work together to enhance users' browsing experiences and derive mutual benefit as a result (e.g., increased advertising revenue or other product revenue, etc.). As another example, a designated partner may have a technology-based agreement with the information provider to use a particular protocol or data format to receive profile information provided by the information provider (e.g., through a search result link) and use the profile information to customized content in some manner.

In some implementations, once search results 120 are identified by the information provider 108, the search results 120 can be processed to determine if any correspond to designated partners. Profile information can be added to search results that correspond to designated partners. For example, with reference to FIG. 1, content provider 104*b* may be a designated partner of the information provider 108. Accordingly, when the information provider 108 receives the query 110 from the cell phone 102*a* and identifies corresponding search results 120 that are responsive to the query 110, the information provider 108 can retrieve profile information (e.g., default location information in profile 119*a*, associated with the cell phone 102*a* (or a user thereof)), and can include the retrieved profile information 119*a* (e.g., location information 122) with a link that corresponds to a designated partner (e.g., link 121*b*, corresponding to designated partner 104*b*). Subsequent selection of the link 121*b* by a user of the cell phone 102*a* can cause the location information 122 to be transmitted to the content provider 104*b* along with a request for corresponding content pointed to by the link 121*b*. The content provider 102*b* can use the location information 122 to customize content provided to the cell phone 102*a*.

Figures 3A, 3B, 3C:
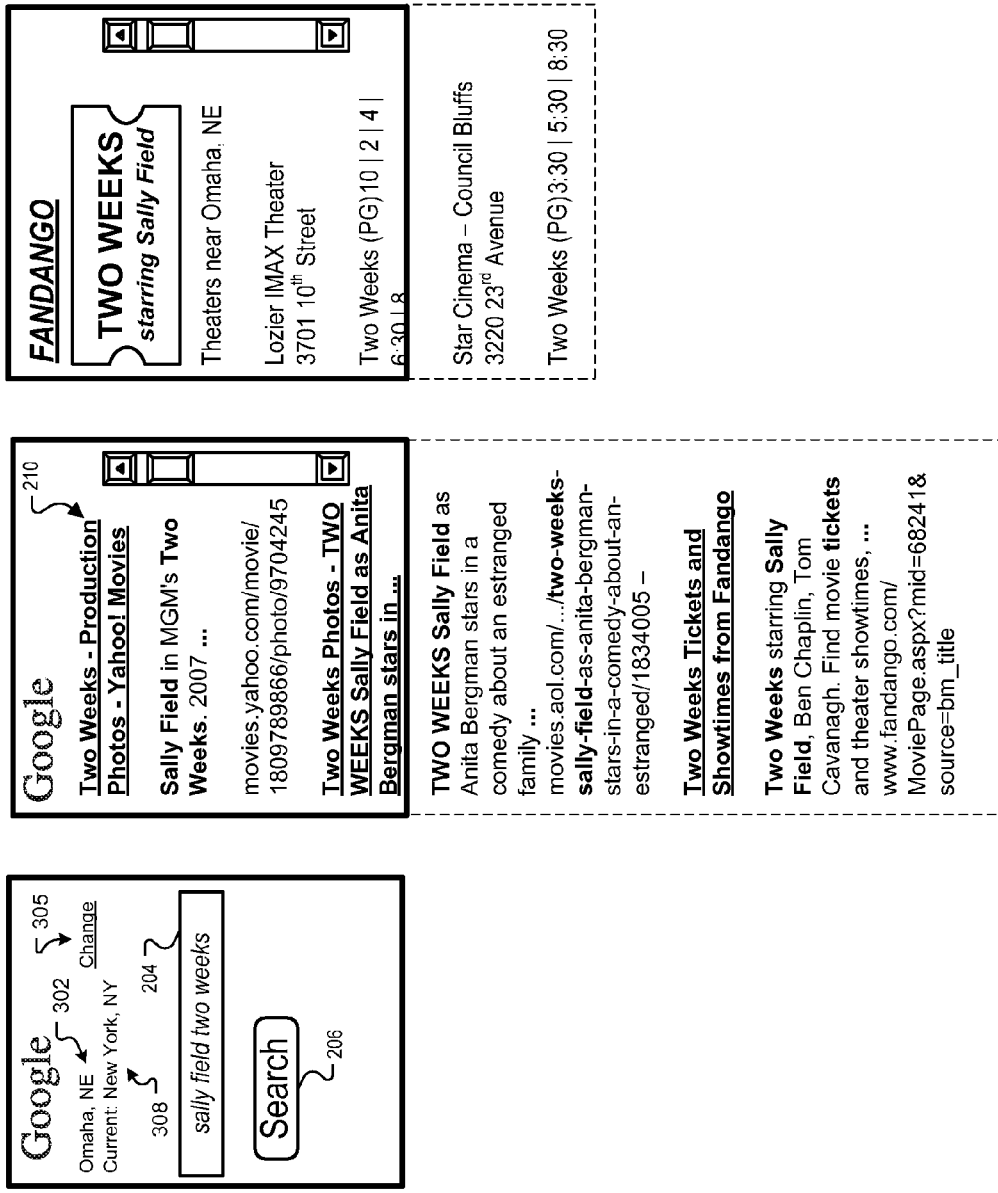
FIGS. 3A-3C are screenshots that depict a search query, search results and content provided by a content provider in response to selection of a search result that includes profile information.

FIGS. 2A-D and FIGS. 3A-C are screenshots illustrating different content that can be provided by the content provider, depending on whether profile information is included in a search result that links to content provided by the content provider. Specifically, the screenshots shown in FIGS. 2A-2D depict content that can be provided when profile information is not included in a search result, and the screen shots shown in FIGS. 3A-3C depict content that can be provided when profile information is included in a search result.

As shown in one implementation in FIG. 2A, a mobile device (e.g., the cell phone 102*a* shown in FIG. 1) can include a browser that can access a search interface, such as Google, through, for example, the networks 112 and 106 that are shown in FIG. 1. A user can employ the search interface to, for example, obtain information about movie showtimes and locations. As shown, a user has entered the query "sally field two weeks" in a search query input box 204. Upon entering the query 204, the user can select a search control 206 to submit the query 204 to Google or a similar information provider.

FIG. 2B depicts an example list of search results 210 that can be returned to the mobile device as a result of the user submitting the query shown in FIG. 2A. In particular, for example, the search results 210 can include links to content related to Sally Field and her movie "Two Weeks." As shown in one implementation, the search results 210 include three entries, each providing a summary and identifying a web site responsive to the query 204. The third entry is a link to movie information available from www.fandango.com. Selection of this link can cause the mobile device's browser to retrieve corresponding content from www.fandango.com.

FIG. 2C depicts example content that may be provided by www.fandango.com upon selection of the corresponding link shown in FIG. 2B. As shown in one implementation, the example content includes an initial request for location information and an input-entry box 220 in which the user of the mobile device can provide the requested location information. In an example implementation, the user can enter a ZIP code or municipality name into the input-entry box 220 in order to get more detailed information for Sally Field's "Two Weeks" that is associated with a desired location. As shown, the user has entered "Omaha, Nebr." as a desired location.

FIG. 2D depicts example content that can be provided in response to the user's entry of a desired location. In particular, FIG. 2D illustrates content related to Sally Field's "Two Weeks" that has been customized for the user's desired location that is depicted in FIG. 2C.

FIGS. 3A-3C depict example content that can be provided by a system that includes profile information (e.g., preferred location information) in a search result, such that the profile information is transmitted to the content provider along with a request for the corresponding content. As shown, FIGS. 3A and 3B correspond to FIGS. 2A and 2B. That is, the information provider can provide links to content that is responsive to the search query submitted through the search query entry box 204, including a link to content from www.fandango.com.

In one implementation, as shown in FIG. 3A, profile information, such as preferred location information, can be displayed (e.g., Omaha, Nebr. 302). Displaying such information can remind the user of the possible impact profile information may have on search results. In some implementations, a control, such as the "change" control 305 can be provided to allow the user to change preferred location information (or other profile information) from the search query entry screen. In one implementation, as shown, an actual physical location can also be displayed (e.g., "New York, N.Y."), which can be different than (and in some cases, geographically distant from (e.g., more than about 25 miles from)) a preferred location that is stored in the user's profile. Some implementations only display a current physical location; other implementations only display a preferred location (or other profile information); some implementations display both current and preferred locations (as shown); some implementations display neither but employ a profile as described throughout this document. In general, FIG. 3A and the other figures are merely exemplary, and other implementations are contemplated.

In contrast to the search results shown in FIG. 2B, one or more of the search results in FIG. 3B can include location information, or other information from a profile associated with the corresponding mobile device. In one implementation as depicted, the location or other profile information is not visible in the search result. For example, the location or other profile information may be included in metadata or other code associated with the search result. In other implementations (not shown), the location or other profile information is displayed with the search results (e.g., similar to the example display of preferred location information 302 in FIG. 3A), for example, to make the user aware that the information will be provided to a corresponding content provider; optionally, in such implementations, the user may have the choice of blocking the transmission of the location or other profile information (e.g., by activation of a control associated with the search result or the displayed location or other profile information).

In implementations in which location or other profile information is included in a search result, and selection of that search result can cause the profile information to be transmitted to the corresponding content provider, and the content provider can use the profile information to provide customized content to the mobile device. For example, as depicted in FIG. 3C, www.fandango.com has provided location-specific information regarding Sally Field's "Two Weeks"—without the user having to enter a desired location through an interface like that depicted in FIG. 2C, and without the user having to include the location in the original search query depicted in FIG. 3A. In this manner, the information provider and content provider can, together, provide a richer user experience than may otherwise be possible.

Figure 4:
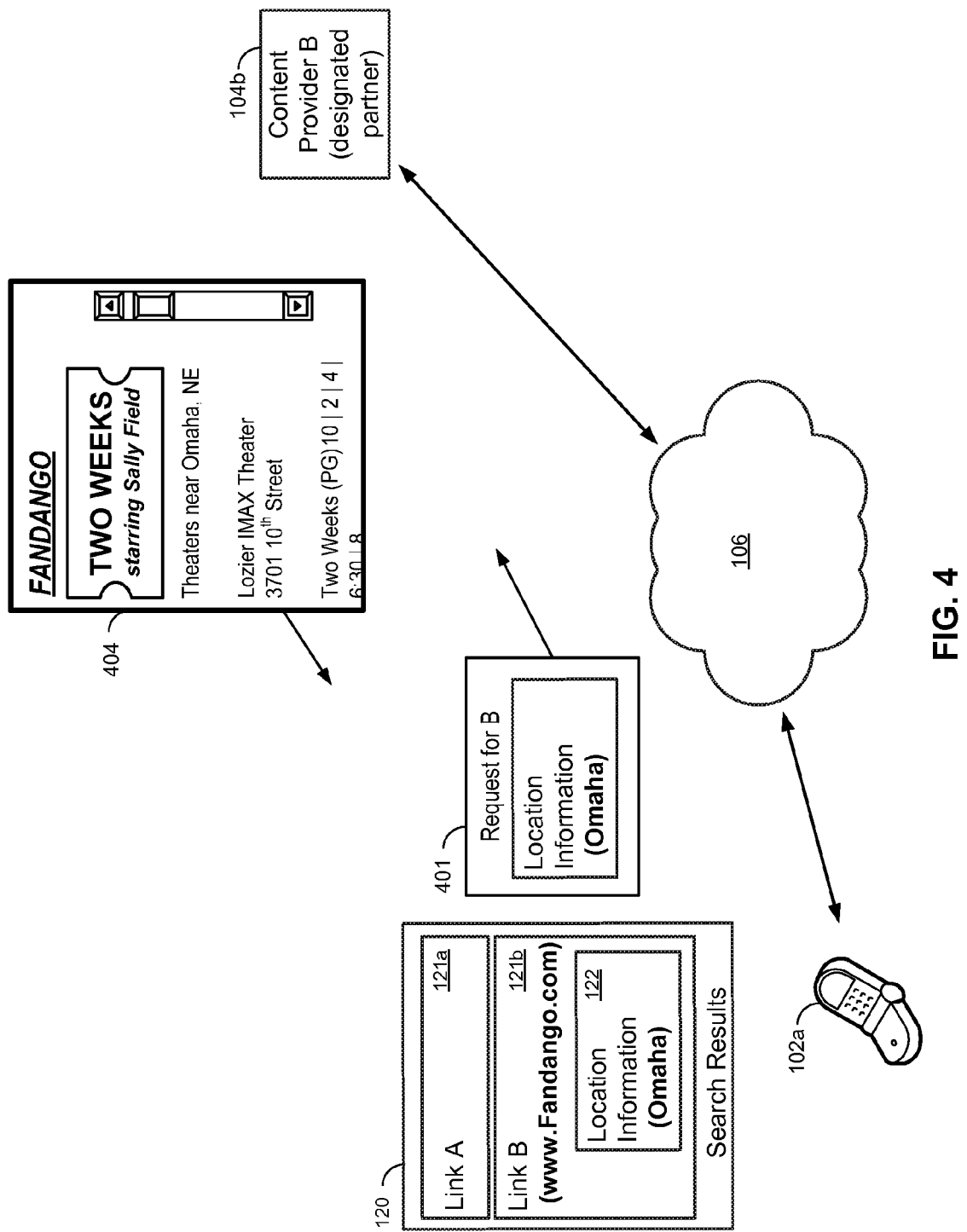
FIG. 4 is a block diagram showing additional details of an example request for content.

FIG. 4 is a block diagram showing additional details of an example request for content that can be transmitted to a content provider in response to a mobile device user selecting a search result. In particular, when the user receives the search results 120 and selects the link 121b, which in this example corresponds to the designated partner content provider 104b and which includes profile information 122 (e.g., a preferred location of "Omaha"), a browser or other application running in the mobile device transmits a request 401 for content that is pointed to by the link 121b. The content provider 104b, which receives the request 401, is, in some implementations, able to customize this content 404 provided in response to the request 401. In particular, for example, as shown, the content 404 has been customized for Omaha, Nebr., based on the location information 122 in the request 401.

In some implementations, the location information 122 (and/or other portions of the request 401) can be encrypted in some manner. For example, the information provider 108 and the content provider 104b may employ public key encryption to protect or secure contents of the request (e.g., for privacy or security reasons).

Figure 5:
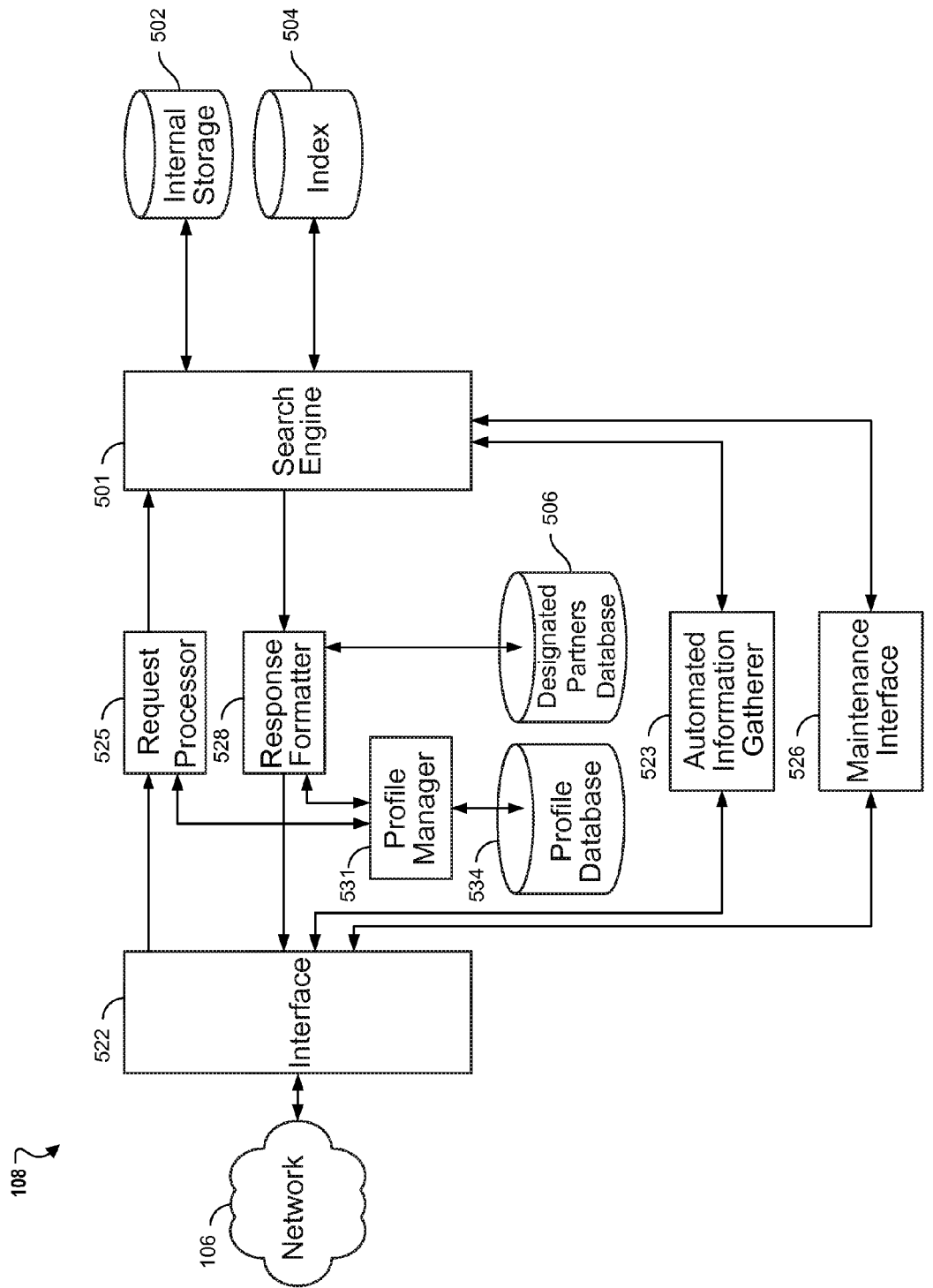
FIG. 5 is a block diagram showing additional details of an example information provider.

FIG. 5 is a block diagram showing additional details of an example information provider 108. As described above, the information provider 108 can be configured to receive queries from various devices; generate results in response to received queries; include location information in search results corresponding to designated partners; and format the results for display in and transmit the formatted results to the device from which the corresponding query was received.

In one implementation, as shown, the information provider 108 includes a search engine 501 and an index 504 for indexing or organizing various information. The index 504 can contain data that represents information that the information provider 108 can provide to users. For example, the search engine 501 can include a typical Internet search engine, and the index 504 can include links to information stored outside the information provider. The information provider 108 can provide links to the externally stored information to users (e.g., in response to search queries), and information corresponding to a specific link can be provided to the user upon selection of the link.

Some information referenced by entries in the index may be stored within the information provider 108 (e.g., in internal storage 502). For example, the internal storage 502 may "mirror" information for which search queries are regularly received, such as, for example, breaking news stories, or weather or traffic information. The internal storage 502 may also store various components needed for general operation of the information provider 108, such as applications system parameters, and information about users who access the system.

The index 504 can be a single index, or the index can be logically separated into several separate indexes (e.g., by a category or type of information, such as web information, images, multimedia files, etc.). The index 504 may or may not be cached. For example, the index 504 may correspond to a separate cached index database or databases (not shown) to support faster access to search results. The index 504 may be local to the information provider 108, or it may include an external server or storage farm (not shown).

In general, the index 504 may be distributed across many different machines and many different physical locations. For example, the index 504 may be implemented by hundreds or thousands of storage devices in multiple data centers around the globe. The internal storage 502 may also be local or distributed.

As shown in one implementation, the information provider 108 interacts with the other devices through an interface 522. In some implementations, the interface 522 includes one or more web servers or application servers through which queries are received and from which information responsive to the queries is transmitted. The interface 522 is shown as a single interface, but the interface 522 can include various other internal interfaces through which information can be routed internal to the information provider. As an example, the interface 522 may comprise interface devices for a high-speed, high-bandwidth network such as SONET, Infiniband, Ethernet, Fast Ethernet, Giga-bit Ethernet, or any suitable communication hardware operating under an appropriate protocol, such that the information provider 108 can respond to a large number of distinct requests simultaneously. The interface 522 may include network interface cards (NICs) or other communication devices and other components or interfaces common to a high-speed, high-bandwidth network. The precise design of the information provider 108 is not critical to this document and can take any suitable form.

Information in the index 504 can be gathered by an automated information gatherer 523, such as, for example, a crawler or spider. In some implementations, the automated information gatherer 523 continuously or almost continuously obtains new information from sources connected to the network 106 or from other sources (not shown) connected to the information provider 108. This new information can be provided to the index 504 or to the internal storage 502 (e.g., directly or through the search engine 501, as shown).

In addition to being added to the index 504 or to the internal storage 502 in an automated fashion, information can be manually loaded in or retrieved from the index 504 or from the internal storage 502 through a maintenance interface 526. In some implementations, the maintenance interface 526 can allow an administrator of the information provider 108 to manually add or remove bulk data.

Data requests, such as search queries, can be processed by a request processor 525. The request processor 525 can, in some implementations, parse search queries or other data requests, and if necessary, reformat them to search strings or search terms that are compatible with the search engine 501. For example, in some implementations, the request processor reformats search queries received in HTTP (Hypertext Transfer Protocol) or text format to a format or protocol employed by the search engine 501. The request processor 525 may also refine received search queries or requests for data, by removing articles, prepositions or other terms deemed to be "non-essential" to completing a search or data access.

In one implementation, as shown, the information provider 108 includes a response formatter 528 for formatting information responsive to a search query or request for data. In some implementations, the response formatter 528 formats the information in a manner that facilitates display of the information in the specific device from which the corresponding query was received (e.g., in a format such as HTML, XML, WML or some other suitable format).

To maintain profiles for users or devices, the information provider 108 can, in some implementations, include a profile manager 531 and a corresponding profile database 534. In some implementations, the profile manager 531 and request processor 525 can receive instructions from a user device to create a new profile for a user or a device or to modify an existing profile. For example, the instructions could be received to add preferred location information to a profile to be used in processing subsequent search queries from the corresponding user or device. As another example, other information could be added to the profile, such as demographic information that could be useful in filtering search results or other content, configuration parameters for displaying search results or other content, user buying patterns, etc.

In some implementations, the profile manager 531 associates a particular profile with a particular user or device based on information in or associated with the search query itself (e.g., a user account identifier included with the search query, an electronic device identifier included with the search query, etc.). Upon identifying a particular profile, the profile manager 531 can retrieve corresponding profile information and provide the profile information to the response formatter 528, for example, for use in adding profile information to certain search results (e.g., search results corresponding to designated partners).

To determine when to include available location or other profile information in search results corresponding to designated partners, the information provider 108 can maintain a designated partners database 506. In some implementations, the designated partners database 506 maintains at least portions of Universal Resource Locator (URLs), Universal Resource Identifiers (URIs), or other links to information associated with content that is maintained by a designated partner. For example, in some implementations, the designated partners database 506 maintains a list of domain names associated with designated partners. In these implementations, the response formatter 528 can, upon receiving search results from the search engine 501, compare domain names in the search results with domain names in the designated partners database 506 in order to determine which search results correspond to designated partners. Other methods of tracking designated partners and associating specific search results with designated partners are contemplated.

As mentioned above, in some implementations, profile information is included with search results that correspond to designated partners. For example, in the example in which Fandago is a partner, profile information (e.g., preferred location information) for a user or device that submitted a query can be added to search results from www.fandago.com that are responsive to the query. In some implementations, the profile information that is added to a search result may have a format that is particular to the corresponding designated partner. For example, preferred location information may be provided to one designated partner in the form of a ZIP code; preferred location information may be provided to another designated partner in the form of GPS or geocode coordinates.

Figure 6:
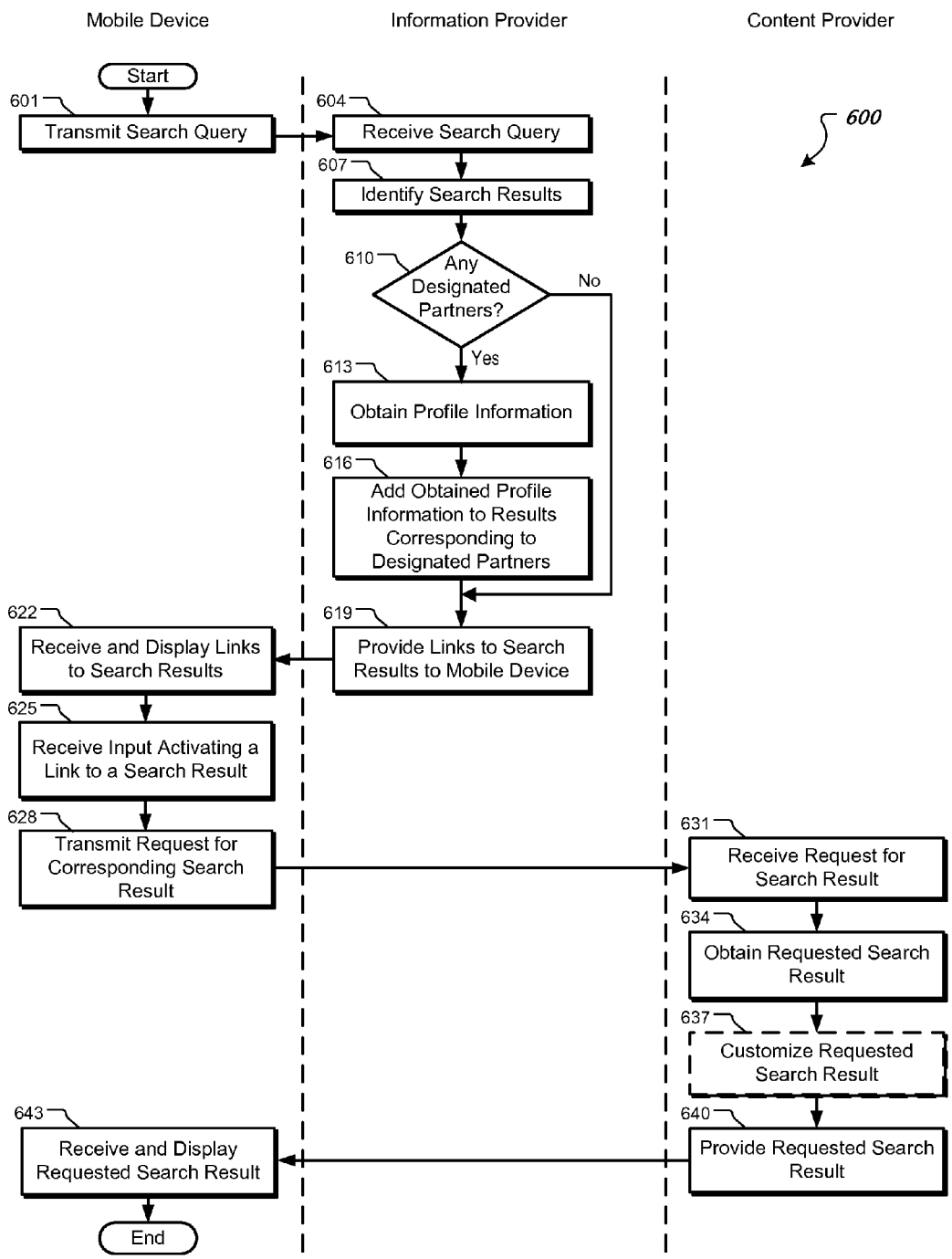
FIG. 6 is flow diagram illustrating an example process by which a user of a mobile device can submit a search query to an information provider and receive in response search results and corresponding content that can be customized based on profile information.

FIG. 6 is flow diagram illustrating an example process 600 by which a user of a mobile device (e.g., a cell phone or smartphone) can submit a search query to an information provider and receive in response search results that can be customized based on profile information (e.g., preferred location information). Individual search results can be subsequently selected by a user of the mobile device, and corresponding content can be retrieved from a content provider associated with the selected search result (e.g., by a browser running on the mobile device). For purposes of example, the actions in the process 600 are illustrated with reference to a mobile device, an information provider and a content provider. However, other arrangements of devices or sites are possible, other devices may be interposed between devices and the order can be different.

As shown in one implementation, a user of the mobile device can transmit (601) a search query to an information provider. For example, with reference to FIG. 1, a user of the cell phone 102a can enter a search query (e.g., "sally field two weeks") and direct the search query to the information provider 108. Physically, the cell phone 102a can transmit (601) the query via the networks 112 and 106 (e.g., a wireless network and the Internet) to the information provider 108.

The information provider can receive (604) the search query from the mobile device. The search query can be executed by a search engine in the information provider 108, and the search engine can identify (607) search results that are responsive to the query. For example, referring to FIG. 5, the information provider 108 can receive (604) the search query via the interface 522, the request processor 525 can format the search query, if necessary, and transmit the (reformatted) search query to the search engine 501, which can execute the search query and identify (607) search results (e.g., by employing the index 504). In some implementations, the search results identify content that is available from content providers that are external to and separate from the information provider 108. For example, in one example, the information provider is Google, and one of the search results identifies content provided by Fandango.

The information provider can determine (610) whether any of the search results correspond to designated partners. For example, in some implementations, the information provider 108 can determine whether any of the search results point to domains that are logged in the designated partners database 506.

If a search result is determined (610) to be associated with a designated partner, the information provider can obtain (613) profile information associated with a user or device that submitted the corresponding search query and add (616) the obtained (613) profile information to the search result. In particular, in the example used throughout this document, the information provider 108 can identify www.fandango.com as a content provider that provides information relevant to a search query for "sally field two weeks" received from the cell phone 102a. The information provider 108 can further determine (610) that www.fandago.com is a designated partner of the information provider and can, accordingly, obtain (613) profile information associated with the cell phone 102a (e.g., preferred location information of Omaha, Nebr.) and add (616) the profile information to the search result (or to a link to the search results) corresponding to www.fandango.com. In some implementations, the profile information is encrypted and provided with the search result in such a manner that when a user of the cell phone 102a selects the search result, the profile information is provided with a corresponding request for the content at www.fandago.com that is pointed to by the search result.

The information provider can provide (619) the search results to the mobile device, which the mobile device can receive (622) and display (622). In some implementations, the search results include links to content that is available from content providers that are external to and separate from the information provider 108. In such implementations, the links themselves can be provided (619), received (622) and displayed (622).

Upon receiving the links to search results, the mobile device can receive input from a user to select a specific search result. In response to the user input, the mobile device can transmit (628) a request for the content pointed to by the search result. In some implementations, if the link to the search result includes profile information, the request for the content can also include the profile information. For example, with reference to FIG. 4, selection of a search result 121b, which includes location information 122, can cause a request 401 for corresponding content to be transmitted to the content provider 104b, where the request 401 also includes the location information 122.

The content provider can receive (631) the request 401 for the search result and obtain (634) the requested search result. For example, with reference to FIG. 2B or FIG. 3B, the content provider (e.g., content provider 104b, www.fandango.com) can receive (631) the request (e.g., request 401) to provide content that is responsive to a query for "sally field two weeks." The content provider can obtain (634) the requested content, and if the request further includes profile information (e.g., preferred location information 122, as shown in FIG. 4), the content provider can customize (637) the obtained (634) content according to the profile information. In particular, for example, with reference to FIG. 3C, the content provider (e.g., Fandango) can customize the content to provide information about Sally Field's move Two Weeks that is specific to Omaha, Nebr., rather than, for example, first providing a generic location query screen as shown in FIG. 2C.

The content provider can then provide (640) the requested search result to the mobile device, and the mobile device can receive (643) and display (643) the requested search result. In some implementations, the requested content is customized (637) based on profile information included in the corresponding request, if the content provider is a designated partner of the information provider, or not customized if the content provider is not a designated partner of the information provider.

Figure 7:
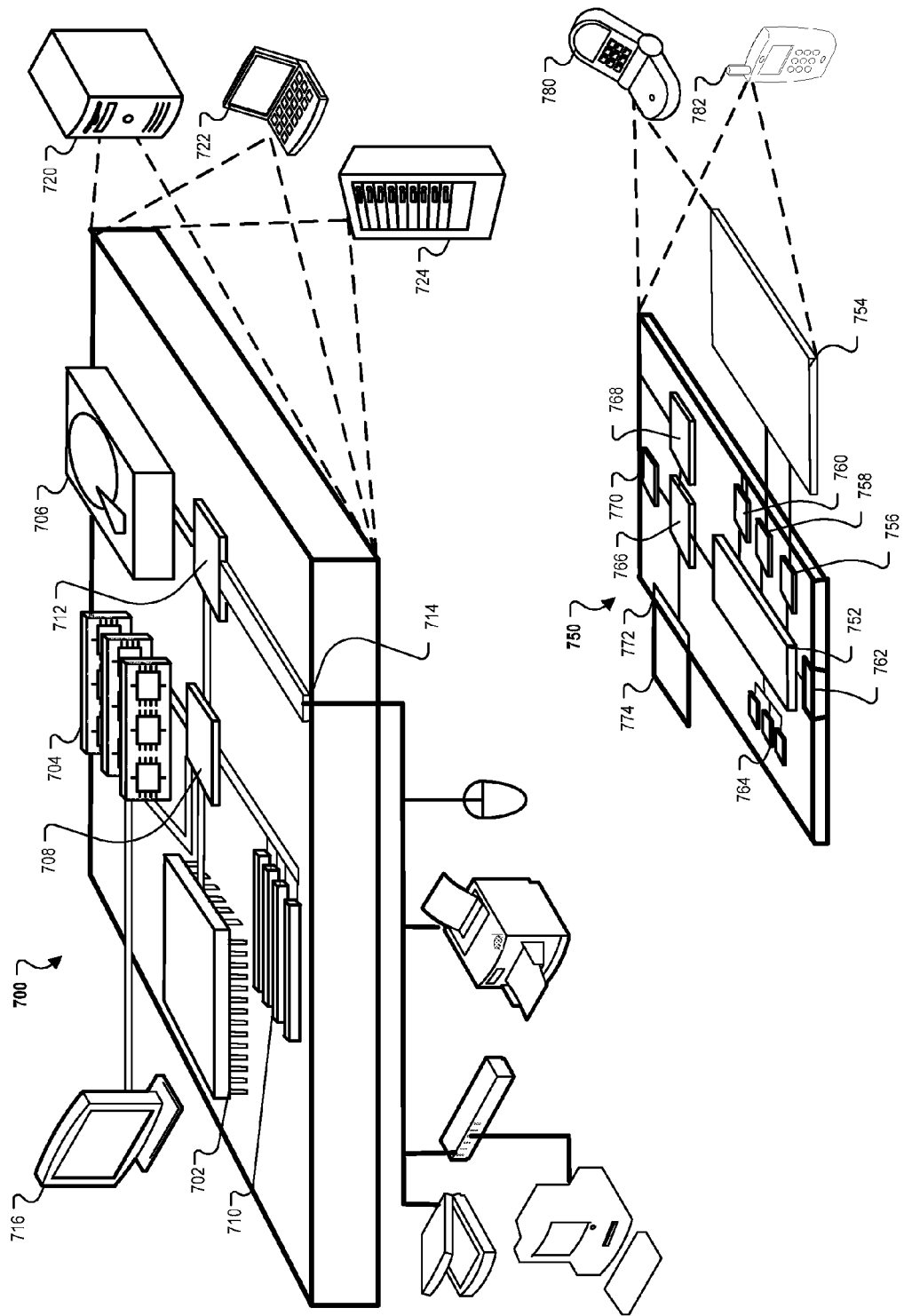
FIG. 7 is a block diagram of example computing devices that can be used to implement the systems and methods described in this document.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various buses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid-state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer-or machine-readable medium, such as the memory 704, the storage device 706, memory on processor 702, or a propagated signal.

The high-speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIM cards, along with additional information, such as placing identifying information on the SIM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer-or machine-readable medium, such as the memory 764, expansion memory 774, memory on processor 752, or a propagated signal.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other categories of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Embodiments may be implemented, at least in part, in hardware or software or in any combination thereof. Hardware may include, for example, analog, digital or mixed-signal circuitry, including discrete components, integrated circuits (ICs), or application-specific ICs (ASICs). Embodiments may also be implemented, in whole or in part, in software or firmware, which may cooperate with hardware. Processors for executing instructions may retrieve instructions from a data storage medium, such as EPROM, EEPROM, NVRAM, ROM, RAM, a CD-ROM, a HDD, and the like. Computer program products may include storage media that contain program instructions for implementing embodiments described herein.

A number of implementations have been described. Nevertheless, it will be understood that various modifications may be made without departing from the spirit and scope of this disclosure. For example, a number of systems and techniques have been described in the context of wireless, mobile devices; however, the systems and techniques could be similarly applied to wired, "less mobile" devices, in order, for example, to improve an overall user experience. Example systems have been illustrated and described, but unless specifically indicated otherwise, the systems can be arranged differently—for example, with more or fewer or different components, or with a different arrangement of the components. Moreover, example methods and techniques have been illustrated and described, but unless specifically indicated otherwise, other methods and techniques are contemplated that can include more or fewer actions, or actions that are performed in a different order or by different devices than are described. Accordingly, other implementations are within the scope of the claims.

What is claimed is:

1. A computer-implemented method comprising:
   receiving a search query, at an information provider, from a mobile device;
   obtaining profile information associated with a user of the mobile device;
   generating a plurality of search results that are responsive to the search query and that identify content that is available from content providers that are external to the information provider;
   associating the profile information with the plurality of search results;
   determining that one or more of the content providers are partner content providers of the information provider, wherein the information provider provides the partner content providers with the profile information associated with the user of the mobile device;
   providing, to the mobile device, the plurality of search results, with the plurality of search results associated with the profile information; and
   after a selection of a search result:
   selectively sharing with a partner content provider the profile information associated with the search result.

2. The computer-implemented method of claim 1, further comprising retrieving the profile information from a profile associated with the mobile device.

3. The computer-implemented method of claim 2, wherein the profile is maintained by the information provider.

4. The computer-implemented method of claim 2, wherein the profile comprises default location information.

5. The computer-implemented method of claim 4, further comprising receiving current location information corresponding to a current physical location of the mobile device, wherein the current location information and the default location information from the profile correspond to geographically distant locations.

6. The computer-implemented method of claim 1, wherein each of the plurality of search results comprises a link that is configured to initiate a session with a corresponding one of the content providers upon activation of the link by the mobile device.

7. The computer-implemented method of claim 1, further comprising determining that one or more of the search results in the plurality of search results correspond to the partner content providers of the information provider.

8. The computer-implemented method of claim 7, wherein determining that the one or more search results in the plurality of search results correspond to the partner content providers comprises determining that one or more domains associated with the one or more search results are included in a database of partner content providers.

9. The computer-implemented method of claim 8, wherein the database of partner content providers is maintained by the information provider.

10. The computer-implemented method of claim 1, wherein the profile information is encrypted.

11. A system comprising:
one or more processing devices; and
one or more machine-readable media configured to store instructions that are executable by the one or more processing devices to perform functions comprising:
receiving a search query, at an information provider, from a mobile device;
obtaining profile information associated with a user of the mobile device;
generating a plurality of search results that are responsive to the search query and that identify content that is available from content providers that are external to the information provider;
associating the profile information with the plurality of search results;
determining that one or more of the content providers are partner content providers of the information provider, wherein the information provider provides the partner content providers with the profile information associated with the user of the mobile device;
providing, to the mobile device, the plurality of search results, with the plurality of search results associated with the profile information; and
after a selection of a search result:
selectively sharing with a partner content provider the profile information associated with the search result.

12. The system of claim 11, wherein the mobile device comprises a mobile communications device.

13. The system of claim 11, wherein the functions further comprise:
encrypting the profile information.

14. The system of claim 11, wherein the profile information comprises default location information.

15. The system of claim 14, wherein the default location information and a current physical location of the user device are geographically distant locations.

16. The system of claim 11, wherein the profile information comprises demographic information associated with the user of the mobile device.

17. The system of claim 11, wherein the profile information comprises technical specification information associated with the mobile device.

18. The system of claim 11, wherein the functions further comprise:
transmitting the profile information to the partner content provider, after selection of the search result.

19. A system comprising:
a module configured to:
receive a search query, at an information provider, from a mobile device;
obtain profile information associated with a user of the mobile device;
generate a plurality of search results that are responsive to the search query and that identify content that is available from content providers that are external to the information provider;
associate the profile information with the plurality of search results; and
determine that one or more of the content providers are partner content providers of the information provider, wherein the information provider provides the partner content providers with the profile information associated with the user of the mobile device; and
means for providing, to the mobile device, the plurality of search results, with the plurality of search results associated with the profile information; and after a selection of a search result: selectively sharing with a partner content provider the profile information associated with the search result.

20. One or more machine-readable media configured to store instructions that are executable by one or more processing devices to perform functions comprising:
receiving a search query, at an information provider, from a mobile device;
obtaining profile information associated with a user of the mobile device;
generating a plurality of search results that are responsive to the search query and that identify content that is available from content providers that are external to the information provider;
associating the profile information with the plurality of search results;
determining that one or more of the content providers are partner content providers of the information provider, wherein the information provider provides the partner content providers with the profile information associated with the user of the mobile device;
providing, to the mobile device, the plurality of search results, with the plurality of search results associated with the profile information; and
after a selection of a search result:
selectively sharing with a partner content provider the profile information associated with the search result.

* * * * *